May 20, 1958 H. RIEDEL 2,835,061
DIAPOSITIVE FRAMES
Filed Aug. 7, 1956 3 Sheets-Sheet 1
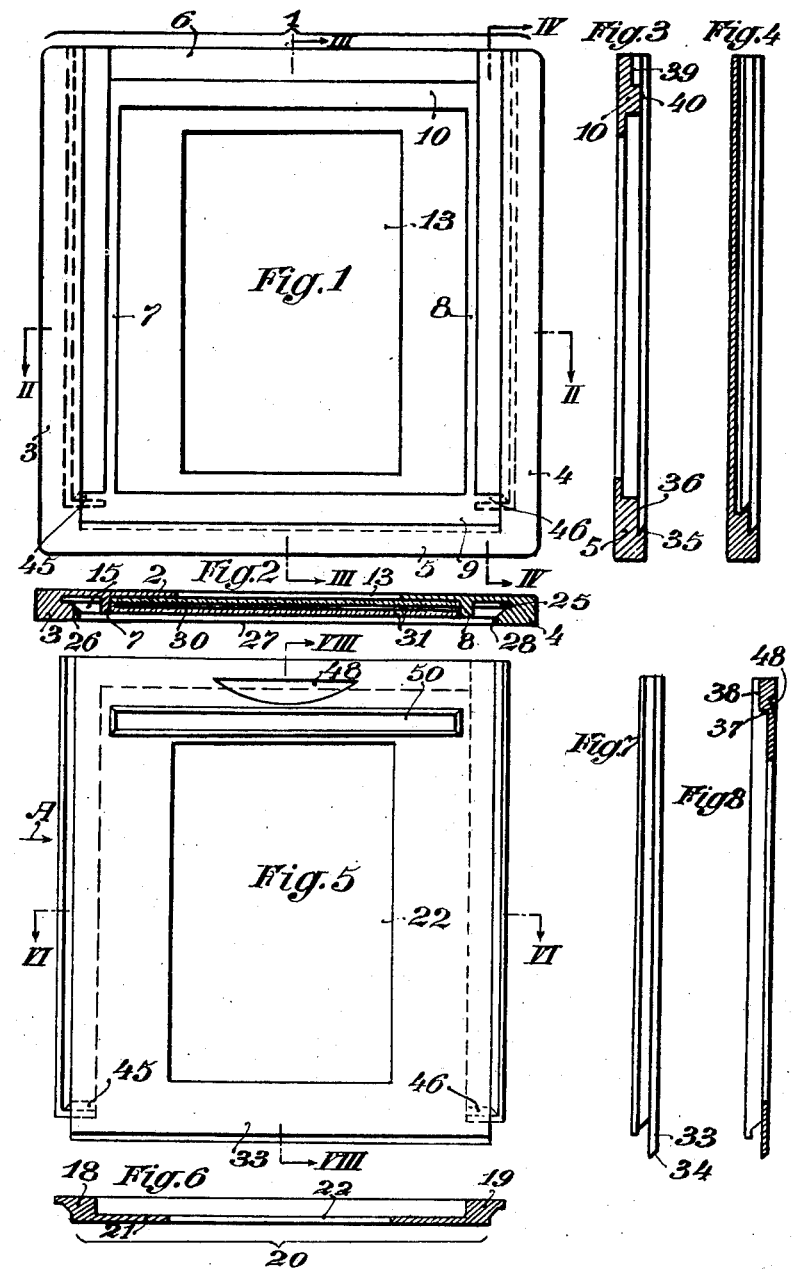

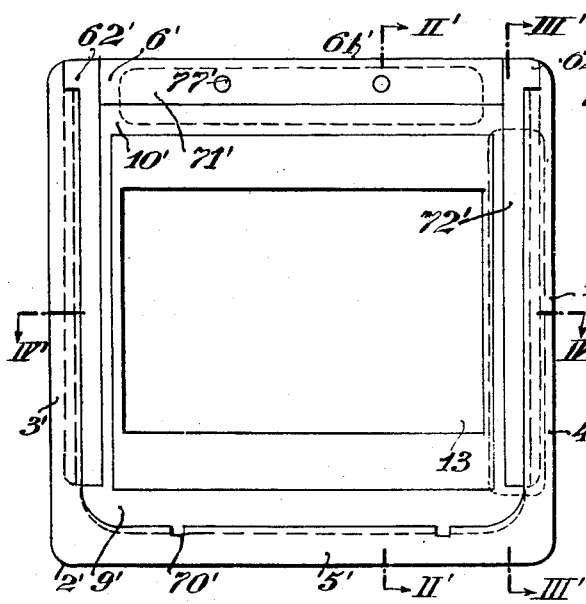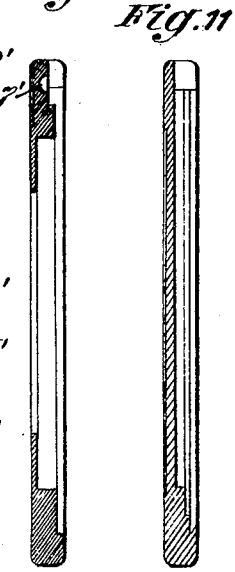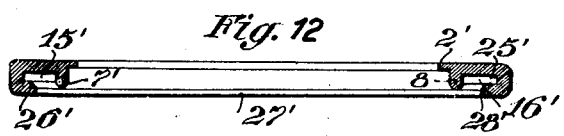

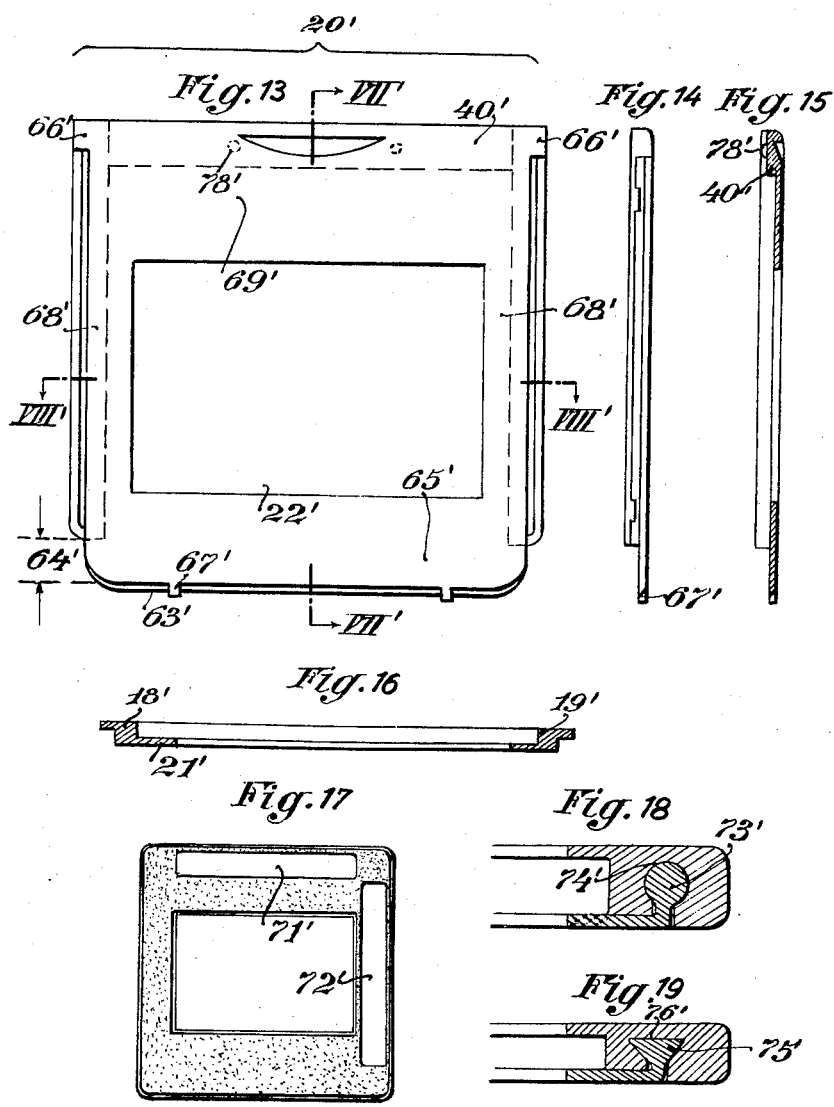

United States Patent Office 2,835,061
Patented May 20, 1958

2,835,061

DIAPOSITIVE FRAMES

Herbert Riedel, Berlin-Zehlendorf, Germany

Application August 7, 1956, Serial No. 602,546

Claims priority, application Germany August 11, 1955

8 Claims. (Cl. 40—152)

The present invention relates to two-piece frames, particularly for reception of diapositives for film image projection.

Hitherto two-piece frames for the reception of diapositives for film image projection have been produced of iron or metal sheet in punching processes. According to other proposals, no frames at all have been used, but two clear sheets of glass were used which were made hingelike collapsible on one side by adhering a paper strip to one edge whereby it was made possible to introduce the film section between the two opening glass sheets. Closing was effected by providing on the inner faces in the edge sections double-sidedly gummed plush or velvet strips which adhere to each other on being collapsed and thus prevent unintentional opening of the glass sheets.

These known constructions have either the disadvantage that they do not offer the desired security against entering of dust or, as far as sheets of glass are bonded together, the possibility is missing quickly and easily to exchange the inserted film strip as the cemented plush or velvet strips do not permit of subsequent easy opening. In the last mentioned embodiment, there exists, in addition, an increased risk of fracture of the sheets of glass since they are not protected by frames at their outer edge. It is exactly the risk of fracture that represents a particularly important factor with such apparatus since they often must be handled in the dark. In addition, there is the increased risk of scratches occurring when the glass sheets are introduced into the frame of the projector.

All these disadvantages are avoided by the invention which thus, to a great extent, meets the customers' wishes; in particular, high dustproof qualities and easy handling in exchanging the film strips is obtained. Good security against formation of scratches, likewise, is obtained. In spite of this, the frame of the invention is cheap in manufacture.

According to the invention, the frame is made of two pieces, one portion comprising the receiving frame and the other one the retractable cover. The film is placed between two sheets of glass. These three parts are jointly placed into a recess provided in the receiving frame. When these simple manipulations have been performed, it is sufficient to merely insert the cover in order to obtain dustproof and secure support of the film strip. The frame portion is provided, at two lateral edges, with marginal reinforcements and upwardly open longitudinal grooves which are engaged by corresponding undercutting marginal reinforcements of the cover portion when the latter is introduced.

In order to facilitate introduction of the cover portion into the frame portion, recesses are provided in the upper section of the enlargements adjacent the guide grooves, said recesses offering the possibility to hold the frame in horizontal position when the retractable cover is introduced into the guide grooves of the frame and to approach the cover portion from above, i. e. vertically to the surface direction of the frame portion so that the lower end, i. e. the tongue of the cover portion may be placed from above with good survey on the upper portion of the glass plate, the marginal reinforcements of the cover portion engaging the groove of the frame portion. When subsequently the cover slides downwardly, it is thus prevented that the tongue of the cover portion impinges on the glass or urges the glass outwardly. The slide cover portion is provided on the closing end within the range of the recesses of the frame portion with lugs such that the frame in the closed position is dust-proof closed also within the range of these recesses.

The tongue portion of the cover portion is provided with two shoulders which engage corresponding recesses in the frame portion. These shoulders serve as casting lugs and are provided on the tongue portion, i. e. the weakest point of the cover portion in order to direct the seam of flow of the casting composition occurring in die-casting into the reinforced part of the slide where the risk of fracture is smallest.

The invention, finally, consists in that on the frame portion there are provided two inscription sections standing at right angles to each other, one each being provided for the upright and broad side size of the frame. The elements of the two-piece diapositive frame made of a synthetic die casting composition have per se surfaces which are smooth to such an extent that inscription thereon is impossible. Inscription on the cited sections, however, is made possible in surprising manner by finely granulating these sections so that an inscription with pencil, ink, India ink or copying pencil is made possible without difficulties. The hitherto usual pasting of paper labels is thus obviated. The granulation, furthermore, offers the advantage that the adhesive adheres well to the rough surface if labels are to be adhered in exceptional cases. This avoids the hitherto occurring difficulties in adhering paper to synthetic materials.

Embodiments of the invention are shown on and explained by the attached drawings which are given merely by way of example.

Fig. 1 is a top view of the receiving frame portion,

Fig. 2 is a cross-section of the receiving frame portion along line II—II of Fig. 1 with inserted glass plates and interposed film section, Fig. 3 is a different cross-section of the receiving frame along line III—III in the Fig. 1 with removed glass plates, Fig. 4 shows a different cross-section through the receiving frame along line IV—IV in Fig. 1, this section lying adjacent the edge, Fig. 5 is a top view of the cover portion of the frame, Fig. 6 is a cross-section of the cover portion along the line VI—VI of Fig. 5.

Fig. 7 is a side view of the cover portion of the frame in the direction of the arrow A in Fig. 5, Fig. 8 shows a different cross-section of the cover portion of the frame along line VIII—VIII of Fig. 5, Fig. 9 is a view on the frame, Fig. 10 shows a cross-section through the frame along the line II—II of Fig. 9, Fig. 11 is another cross-section of the frame along the line III—III of Fig. 9, Fig. 12 is a cross-section of the frame along the line IV—IV of Fig. 9, Fig. 13 is a top view of the cover portion of the frame, Fig. 14 is a side view of the cover portion, Fig. 15 is a cross-section through the cover portion along the line VII—VII of Fig. 13, Fig. 16 is a cross-section of the cover portion along the line VIII—VIII of Fig. 13, Fig. 17 is a rear view on the frame portion showing the two inscription sections, Fig. 18 shows a partial cross-section through the frame portions with inserted cover portion having another profile construction, and Fig. 19 shows a cross-section similar to Fig. 18, but showing a third profile configuration.

The receiving frame 1 of the two-piece frame comprises a relatively thin-walled base plate 2 of almost square dimensions. On this base plate, in the marginal sections thereof, there are provided frame-like marginal reinforcements 3, 4, 5, 6 which exclusively extend upwardly whereby the lower defining surface of the base plate is plane. Inwardly spaced from these marginal reinforcements, there are provided ribs 7, 8, 9, 10 which extend from the base plate and likewise are directed upwardly. The height of these ribs and the rectangular space inwardly surrounded by them is dimensioned such that two glass plates with associated diapositive film are just accommodated. In the center, the base plate 2 is provided with a window 13 through which the light rays may pass during projection. In Fig. 1, the window is shown as upright rectangle. It may be turned, however, by 90°. Between the lateral marginal reinforcements 3, 4 and the lateral ribs 7, 8 upwardly open longitudinal grooves 15, 16 are formed. They serve for the reception of accordingly shaped marginal reinforcements 18, 19 of the cover portion 20. The marginal reinforcements lie at the edges of the cover plate 21. In order to provide the cover plate outwardly with a smooth and good-looking appearance, the marginal reinforcements on the edges of the cover portion are downwardly directed. The cover plate is provided with a window 22 corresponding to the receiving frame portion 1 and which is likewise shaped as upright rectangle on the member shown. If a transverse rectangle is to be used on the receiving frame portion, a corresponding rectangle, likewise lying transversely must be provided as window on the cover portion. Since dust-proof construction is of particular importance according to the invention, the longitudinal grooves 15, 16 in the receiving frame portion are characterized by a multiple profile. Thus in the lowermost portion, a narrow groove portion 25 is provided extending far to the sides and followed by an inclined edge 26. This edge does not extend up to the upper surface 27 of the receiving frame since otherwise a sharp-edged rim would be created which is undesirable in many respects. Such sharp-edged rim would be rather liable to be damaged and could, on the other side, lead to wounds of the fingers when handled by the operator. For this reason, the inclination 26 is followed by a rectangular edge 28. The marginal reinforcement of the cover portion 20 has a corresponding profile. When, furthermore, attention is paid to the feature that the filmstrip 30 lying between the two glass plates 31 laterally is enclosed by the ribs 7, 8, then it is apparent that dust particles must pass a comparatively long path which, in addition, is provided with multiple bends before they can impinge on the film. This offers a particulary high security against undesired penetration of dust at these marginal parts.

More difficult was the formation of dust-proof seals at the front and rear edges. In order to provide, here too, dust-proof sealing as far as possible, the cover plate was forwardly extended by a tongue 33 which, in inserted state engages with an inclination 34 and accordingly undercut inclined face 35 at the front marginal reinforcing stripe 5 of the receiving frame portion. Since this tongue 33 rests on the comparatively broad surface 36 of the receiving frame, a good seal against penetration of dust is provided also here.

The rear edge of the cover portion is provided with a shoulder 37 which, in inserted state, rests with its surface 38 on the corresponding surface 39 of the receiving frame portion. The surface 40 of the rib 10, furthermore, serves as additional sealing face on which the cover plate of the cover portion rests when inserted.

Adjacent the two lateral limits of the tongue 33, there are provided both on the frame portion and on the cover portion short side profiles 45, 46 evident on Figs. 1 and 5 and which are the corners where the danger of penetrating dust is particularly high, ensure increased security against penetration of dust, particularly since here the cover tongue 33 to a certain degree overlaps these corner profiles 45, 46.

In order to easily open the cover portion, a segment 48 is recessed at the rear edge to be engaged by the nail of a finger. For the purpose of inscriptions for the filing in file cabinets, there is provided on the cover portion 20 between said recess 48 and the window 22 a slightly recessed surface 50 on which a paper label of corresponding shape may be adhered. The total receiving frame inclusive of the cover portion is made preferably of a synthetic composition in die casting or pressing operation.

According to the embodiment shown in Figs. 9–12, the frame 1' comprises a comparatively thin-walled base plate 2' of almost square dimensions. On this base plate, in the marginal sections thereof, there are provided frame-like marginal reinforcements 3', 4', 5', 6' which exclusively extend upwardly, whereby the lower defining surface of the base plate is plane. Inwardly spaced from these marginal reinforcements, ribs 7', 8', 9', 10' are provided which extend from the base plate and, likewise, are directed upwardly. The height of these ribs and the rectangular space surrounded by them is dimensioned such that two glass plates with an associated diapositive film are just accommodate so that, after insertion, the upper glass plate is flush with the ribs 7', 8', 9', 10'.

In the center, the base plate 2' is provided with a window 13' through which the light rays may pass during projection. The window in Fig. 9 is shown as transverse rectangle. It may be turned, however, by 90° and thus be formed as upright rectangle. Between the lateral marginal reinforcements 3', 4', and the lateral ribs 7', 8', upwardly open longitudinal grooves 15', 16' are formed serving for the reception of accordingly shaped marginal reinforcements 18', 19' of the cover portion 20'. The marginal reinforcements lie at the edges of the cover plate 21'. In order to provide the cover plate with a smooth and good-looking appearance, the marginal reinforcements are downwardly directed and provided at the edges of the cover portion. The cover portion is provided with a window 22' corresponding to the frame portion 1' and which is likewise shaped as transverse rectangle on the member shown.

Since dust-proof construction is of particular importance according to the invention, the longitudinal grooves 15', 16' in the receiving frame portion and in the slide portion are characterized by multiple profiles. Thus in the lower portion, a narrow groove portion 25' is provided extending far to the sides and followed by an inclined edge 26'. This edge does not extend up to the upper surface 27' of the receiving frame since otherwise a sharp-edged rim would be created which might lead to damages. For this reason, the inclination 26' is followed by a rectangular edge 28'. The marginal reinforcement of the cover portion 20' has a corresponding profile.

In order to facilitate introduction of the cover portion, the frame portion 1' is provided adjacent the upper edge 61' wtih recesses 62' by which the overlapping grooves 15', 16' are interrupted. When the cover is introduced, therefore, it is not necessary to enter it from the narrow side into the frame portion, but one may approach the cover portion to the frame portion from above transversely to the subsequent direction of the slide, holding the frame horizontally, whereby the correct position of the two parts relative to each other may well be observed. When the lower ends of the marginal reinforcements of the cover portion have arrived at the bottom of the two longitudinal grooves on passing the two recesses, then it is merely necessary to effect a sliding movement to easily insert the slide portion into the groove.

The marginal reinforcements 18', 19' advantageously, are not extended down to the lower edge 63', but are discontinued a certain distance 64' before. In this way, it is achieved that the lower portion 65' of the slide portion, the so-called tongue, projecting beyond the ends of the marginal reinforcements covers the upper edge of the glass plate already when the slide portion contacts it. This offers the advantage that on inwardly displacing the cover portion there does not arise the risk that the tongue impinges on the glass and thus impedes the inserting procedure. Thus easy and fool-proof sliding of the cover portion is guaranteed. In order to safeguard dust-proof sealing in spite of the recesses 62', corresponding lugs 66' are provided on the slide portion 20', these lugs fitting snugly into the recesses 62' when the slide portion is in closed position.

Two casting lugs 67' are provided on the tongue portion 65' by means of which the material is injected into the mold in the casting process. Hereby it is obtained that the entering die-casting material divides in two currents which flow through the two side portions 68' of the cover portion and meet at some place in the relatively thick cross portion 69'. The flow seam thus exists in the strongest portion of the cover portion thus eliminating risk of fracture.

In order to provide for the necessary room for the casting lugs 67' also in the frame portion, corresponding recesses 70' are provided at the upper edge of the lower transverse marginal reinforcement 5'.

Two inscription sections 71', 72' are provided on the rear side of the frame portion by finely granulating the surfaces of the inscription sections. According to the embodiment of Fig. 10, the marginal reinforcements 73' on the slide portion are made circular in cross-section, and accordingly the groove 74' on the frame is also shaped circularly. In a further embodiment according to Fig. 11, the marginal reinforcement 75' has triangular cross-section and the recess 76' on the frame portion is likewise of triangular cross-section. In order to prevent inadvertent disengagement after insertion of the slide portion, it is advantageous to provide on the uper transverse reinforcement 6' of the frame portion 2', preferably semispherical hollows 77' which are engaged by correspondingly shaped projections 78' which are provided on the upper transverse reinforcement 40' of the slide portion.

While the invention has been described and illustrated in the aforesaid embodiments, it is not intended to be limited to the details shown since various modifications and structural changes may be made without departing in any way from the spirit of the present invention.

What I claim as my invention and desire to secure by Letters Patent of the United States is:

1. A two-piece mounting device for projection film strips, said mounting device comprising a rectangular film-strip receiving frame and a retractable, slidably received, rectangular cover therein; said frame further comprising a bottom face having a substantially rectangular opening therein, first and second opposed inwardly grooved edge portions extending upwardly from said bottom face, and a third edge portion formed with an inwardly directed undercut face, and defining with said first and second edge portions a closed end of said frame and the upper face thereof, said frame having an open end opposite said closed end; first and second rib portions extending upwardly from said bottom face and disposed inwardly of said frame and spaced parallelly to said first and second edge portions; a third rib portion extending from said bottom face adjacent said open end of said frame, said first, second and third rib portions defining with the said inwardly directed undercut face of said third edge portion and with said bottom face, a rectangular compartment for receiving a pair of glass plates and a film strip therebetween; said cover being formed with opposed, undercut, tongue-like edges corresponding to said first and second grooved edge portions, and slidably engaging therewith, said cover having a substantially rectangular opening corresponding to said opening in said frame when said cover is inserted therein, whereby a pair of glass plates and a film strip may be secured between said frame and said cover, and the passage of dust to said film strip prevented.

2. The device according to claim 1, wherein said rectangular compartment is formed with a face lower than that of said upper face of said frame.

3. The device according to claim 2, wherein said tongue-like edges of said cover are provided with inwardly directed undercut faces contacting said face of said rectangular compartment.

4. The device according to claim 3, wherein said tongue-like edges are formed with inclined surfaces, and said grooved edge portions are formed with surfaces corresponding with the inclined surfaces of said edges.

5. The device according to claim 4, wherein said first and second grooved edge portions are formed with recesses therein, adjacent said open end of said film-strip receiving frame, and said tongue-like edges of said cover are each formed with a projection corresponding in shape with said recesses respectively, whereby when said cover is slidably inserted in said frame, said projections are in intimate contact with said recesses and the passage of dust to a film strip is prevented.

6. The device according to claim 5, wherein said cover is formed with a flat transverse portion defining the length of said tongue-like edges, for intimately contacting said undercut face of said third edge portion, whereby when said cover is inserted in said frame, the passage of dust to a film strip is prevented.

7. The device according to claim 1, wherein said tongue-like edges and said grooved edge portions are of circular cross-section.

8. The device according to claim 1, wherein said tongue-like edges and said grooved end portions are of triangular cross-section.

References Cited in the file of this patent

UNITED STATES PATENTS

| | | |
|---|---|---|
| 2,088,944 | Young et al. | Aug. 3, 1937 |
| 2,528,366 | Houston | Oct. 31, 1950 |

FOREIGN PATENTS

| | | |
|---|---|---|
| 746,608 | Germany | Aug. 16, 1944 |